(12) United States Patent
Koops et al.

(10) Patent No.: US 7,371,443 B2
(45) Date of Patent: May 13, 2008

(54) MULTILAYER LASER TRANSFER FILM FOR PERMANENTLY INSCRIBING PARTS

(75) Inventors: Arne Koops, Breitenfelde (DE); Sven Reiter, Hamburg (DE)

(73) Assignee: Tesa AG, Hamburg (DE)

( * ) Notice: Subject to any disclaimer, the term of this patent is extended or adjusted under 35 U.S.C. 154(b) by 433 days.

(21) Appl. No.: 10/508,218

(22) PCT Filed: Feb. 22, 2003

(86) PCT No.: PCT/EP03/01824

§ 371 (c)(1),
(2), (4) Date: May 11, 2005

(87) PCT Pub. No.: WO03/080334

PCT Pub. Date: Oct. 2, 2003

(65) Prior Publication Data

US 2006/0051604 A1  Mar. 9, 2006

(30) Foreign Application Priority Data

Mar. 23, 2002 (DE) ................................ 102 13 110

(51) Int. Cl.
*B41M 5/40* (2006.01)

(52) U.S. Cl. .................. 428/32.64; 156/235; 428/40.1; 428/354; 430/945

(58) Field of Classification Search ...................... None
See application file for complete search history.

(56) References Cited

U.S. PATENT DOCUMENTS

| 5,534,383 | A | 7/1996 | Takahashi et al. ........... 430/201 |
| 5,626,966 | A | 5/1997 | Külper et al. ............. 428/423.1 |
| 5,641,506 | A | 6/1997 | Talke et al. .................. 424/443 |
| 5,853,955 | A | 12/1998 | Towfiq ................... 430/270.12 |
| 5,981,640 | A | 11/1999 | Choi ........................... 524/424 |
| 6,241,289 | B1 | 6/2001 | Külper et al. .................. 283/86 |

FOREIGN PATENT DOCUMENTS

| DE | 81 30 861.2 | 1/1983 |
| DE | 689 27 136 | 12/1989 |

(Continued)

OTHER PUBLICATIONS

Wildmann D. et al, "Lasernsensibel Pigmentierte Kunststoffe Industriell Beschriften", Kinststoffe, Carl Hanser Verlan, Munich, Germany, Bd. 79, Nr. 12, 1 December 19898, pp. 1307-1310.

(Continued)

*Primary Examiner*—Bruce H. Hess
(74) *Attorney, Agent, or Firm*—Norris McLaughlin & Marcus, PA

(57) ABSTRACT

A multilayer laser transfer film for permanently inscribing parts made from at least one backing layer, where on at least part of the underside of the backing layer there is a first adhesion layer, characterized in that, on the backing-layer side of the laser transfer film, this being the location of the first adhesion layer, there are at least two pigment layers, preferably a first pigment layer applied to at least part of the material and comprising at least one glass flux pigment, and a second pigment layer applied to at least part of the material and comprising at least one laser-sensitive pigment.

14 Claims, 2 Drawing Sheets

FOREIGN PATENT DOCUMENTS

| | | | |
|---|---|---|---|
| DE | 196 30 478 | A | 1/1990 |
| DE | 42 37 252 | A1 | 5/1994 |
| DE | 43 08 649 | A1 | 9/1994 |
| DE | 43 24 748 | C1 | 10/1994 |
| DE | 43 13 008 | C1 | 11/1994 |
| DE | 195 25 958 | A | 1/1997 |
| DE | 100 35 905 | A | 2/2002 |
| DE | 695 00 454 | T2 | 2/2002 |
| EP | 0 388 713 | A | 9/1990 |
| EP | 0 353 972 | B1 | 1/1994 |
| EP | 0 578 151 | | 1/1994 |
| EP | 0 679 531 | B1 | 11/1995 |
| EP | 0 688 678 | A | 12/1995 |
| EP | 0 345 032 | B1 | 9/1996 |
| EP | 0 732 678 | A | 9/1996 |
| EP | 0 761 461 | A | 3/1997 |
| EP | 0 911 787 | A2 | 4/1999 |

OTHER PUBLICATIONS

Edler, G., "Perlglanzpigmente Ermoelgichen Lasermarkierungen", Plastverarbeiter, Zeichner and Huethig Verlag GmbH, Speyer/Rhein, Germany, Bd. 40, Nor. 12 Dec. 1, 1989, pp. 44-45.

Delp, R. "Funktionelle Pigmente zur Lasermarkierung von Kunststoffen", Coating, St. Gallen, Ch, Bd. 32, Nr. 7, 1999, pp. 290-293.

"Laserbeschriften Nun Auch Bei Polyolefinen Moeglich", Kunststoffen, Carl Hanser Verlag, Munich, Germany, Bd. 79, Nr. 11, Nov. 1, 1989, p. 1138.

Reganall T. et al, "Pigmenting Benefits Laser Marking of Thermoplastics", Modern Plastics International, McGraw-Hill, Inc., Lausanne, CH, Bd. 28, Nor. 10, Oct. 1998, pp. 224, 226, 228.

Mvers, J., "Lasers Make Their Mark on Variety of Plastics Parts", Modern Plastics International, McGraw-Hill, Inc., Lausanne, CH, Bd. 23, Nr. 10, p. 30, no date.

Specification of U.S. Appl. No. 08/230,355; "Acrylate Hot Melt-Based Self-Adhesive Compositions", Harder et al; filed Apr. 20, 1994.

MULTILAYER LASER TRANSFER FILM FOR PERMANENTLY INSCRIBING PARTS

This is a 371 of PCT/EP03/01824 filed 22 Feb. 2003 (international filing date).

The invention relates to a multilayer laser transfer film for permanently inscribing part made from at least one backing layer, where on at least part of the underside of the backing layer there is a first adhesion layer, on which at least two pigment layers have been applied.

BACKGROUND OF THE INVENTION

Industrial labeling is one of the methods used for the identification marking of components on vehicles, on machinery, and on electrical and electronic devices, examples being model-identification plates, labels for process control, and guarantee badges and test badges.

Increasing importance is being attached to identification marking by means of laser labels or printed or coated metal plates, specifically in the automotive industry, in particular for high-quality markings. This method is used to place information and advice, such as tire pressure or fuel type, on a very wide variety of components in the automobile for its subsequent user. A laser label may also be used to convey important production data within upstream stages of manufacture.

For this use, the label may be inscribed with a bar code. A suitable reading device gives an assembly team the opportunity of using the bar code for read-off of information concerning model, color, and special equipment, directly on the manufacturing line. Labels are used on the vehicle not only for this standard information but also for the placing of sensitive security data, such as chassis number and identification numbers. In the event of theft or an accident, this information is very important for tracing of a vehicle and of stages in manufacture.

The label material used therefore has to be highly counterfeit-proof, in order to prevent any attempt at manipulation. It has to be impossible to remove the label intact from the base to which it adheres.

Additional security is achieved by using highly breakable material in combination with high adhesive strengths. The adhesive strength of the material on the adhesion base is very significant. It is a decisive factor for resistance to any attempt at manipulation by removal.

Besides the standard material, there are modified labels intended to eliminate any possibility of imitating the material by using other safety features, such as embossments, holograms, or a lasting UV impression (footprint).

There are widely used high-performance controllable lasers for introducing markings, such as inscriptions, codings, and the like, using a burning process. Some of the requirements placed upon the material to receive the inscription, or used for the inscription process, are:

It has to be capable of rapid inscription.
A high degree of spatial resolution capability has to be achieved.
It has to be very simple to use.
The decomposition products have to be non-corrosive.
For particular cases moreover, additional properties are demanded:
The markings produced by applying the laser have to have sufficient contrast to be capable of being read without error even under unfavorable conditions and over large distances.
Heat resistance has to be high, for example extending above 200° C.
Good resistance to weathering, water, and solvents is desirable.
Complete separation of labels from the substrate is possible using sharp, flat blades. The bond between adhesive mass and substrate exhibits particular weaknesses on plastics substrates, such as polyethylene or polypropylene.

Despite increased adhesive strength on metallic or coated substrates, it is also possible here to remove part of the labels without irreversible damage, by using specific tools. A specific tool with a blade can be passed under the label at a shallow angle. Careful cutting movements can lift an edge, producing what is known as a grab site. This method creates a point of attack, which facilitates release.

This means that labels have a fundamental disadvantage.

If printing, rather than a laser label, is used to apply the inscriptions to the component, third parties can easily remove the inscription by washing or scratching. Simple rubbing of the inscribed article on a second article, for example a packing, is also often sufficient to reduce the clarity of the individual letters or numerals.

It is an object of the invention to provide a multilayer laser-transfer film which permits rapid and precise inscription of any desired component, and which meets the above-mentioned demand for improved security against counterfeiting, and which cannot be removed intact, even with the aid of a cutter, and which besides this in particular also has high contrast, high capability for resolution, high heat resistance, and good ease of use.

SUMMARY OF THE INVENTION

This object is achieved by a multilayer laser-transfer film for durable inscription on components made from at least one backing layer, where on at least part of the underside of the backing layer there is a first adhesion layer, and where at least two pigment layers are present on the side of the backing layer of the laser transfer film which is the location of the first adhesion layer.

There is preferably a first pigment layer applied to at least part of the material and comprising at least one glass flux pigment and a second pigment layer applied to at least part of the material and comprising at least one laser-sensitive pigment.

In one advantageous embodiment of the invention, the first pigment layer comprises a glass flux pigment and an absorber, and/or the second pigment layer comprises a glass flux pigment, an absorber, and a laser-sensitive pigment.

DETAILED DESCRIPTION

The adhesive mass is preferably applied to the entire surface of the backing layer but, depending on the application, may also be coated onto part of the material. If the first pigment layer is applied, this may firstly have direct contact with the backing layer, but secondly may also lie upon the first adhesion layer, and specifically irrespective of whether the first pigment layer has likewise been applied to part of the material.

Similar factors apply to the second pigment layer, and also to any subsequent pigment layers. Each of the second and the subsequent pigment layers is coated onto the previously applied layers, onto part of the material or onto the entire surface, depending on the application. The result is very wide variations in the structure of the laser transfer film, depending on the nature of the application process, and also on the distribution of each of the underlying layers.

It is preferable that the matrix of the layers comprising the pigments is likewise composed of the adhesive of the first adhesion layer, so that the first adhesion layer and the pigment layers form a single homogeneous layer. The pigments have their distribution in various compositions only in the periphery of the homogeneous layer, and specifically on the side facing away from the backing layer, and in particular in a comparatively narrow region of the homogeneous layer. Two or more boundary layers are accordingly formed.

For further improvement of the adhesion properties of the multilayer laser-transfer film on the component to receive an inscription, there is preferably a second adhesive layer applied to the second pigment layer comprising the laser-sensitive pigment.

A particular manner of application of the second adhesive layer is that of dots or screen print, or, where appropriate, an edge print, the result being that the transfer film can be adhesive-bonded to the substrate in any desired manner.

The thicknesses of the individual layers are preferably selected from the following ranges:

| | |
|---|---|
| Backing layer (preferably PET) | 12 μm-240 μm, particularly 100 μm-200 μm |
| Adhesive mass (preferably acrylate) | 5 μm-45 μm, particularly 25 μm-35 μm |
| first pigment layer | 1 μm-10 μm, particularly 2 μm-5 μm |
| second pigment layer | 1 μm-10 μm, particularly 2 μm-5 μm |

The films intended for use as backing material according to the invention have to be transparent and/or translucent, and at least designed in such a way as to prevent any absorption of the laser beam, which would lead to their breakdown.

In particular, it is desirable that the backing material absorbs no light within the wavelength range from 530 to 1064 nm.

According to the invention, the backing materials used preferably comprise films which, in another excellent variant of the invention, are transparent, in particular monoaxially or biaxially stretched films based on polyolefins, i.e. films based on stretched polyethylene or on stretched copolymers, containing ethylene and/or polypropylene units, and, where appropriate, PVC films, films based on vinyl polymers, on polyamides, on polyester, on polyacetals, or on polycarbonates.

PET films in particular have outstanding suitability as backing.

According to the invention, the backing film used also comprises films based on stretched polyethylene or on stretched copolymers comprising ethylene and/or polypropylene units.

Monoaxially stretched polypropylene has a very high tensile stress at break and low longitudinal strain. Monoaxially stretched films based on polypropylene are preferred for producing the labels of the invention.

For the laser transfer films of the invention, particular preference is given to single-layer biaxially or monoaxially stretched films and multilayer biaxial or monoaxial films based on polypropylene which have a sufficiently strong bond between the layers, since delamination of the layers during use is disadvantageous.

Films based on rigid PVC or films based on plasticized PVC may be used for producing laser transfer films.

For the laser transfer films of the invention, it is preferable to use films based on rigid PVC.

Films based on polyester, for example polyethylene terephthalate, are likewise known and may also be used for producing the transfer films of the invention.

Polyesters are polymers whose skeletal units are held together by ester bonds (—CO—O—). The materials known as homopolyesters may be divided into two groups according to their chemical structure, the hydroxycarboxylic acid types (AB polyesters), and
the dihydroxy dicarboxylic acid types (AA-BB polyesters).

The former are prepared from just one single monomer, for example by polycondensing a ω-hydroxycarboxylic acid 1, or by ring-opening polymerization of cyclic esters (lactones) 2, for example

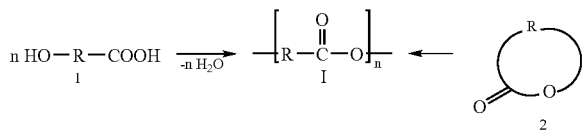

The structure of the latter arises, in contrast, by polycondensing two complementary monomers, for example a diol 3 and a dicarboxylic acid 4:

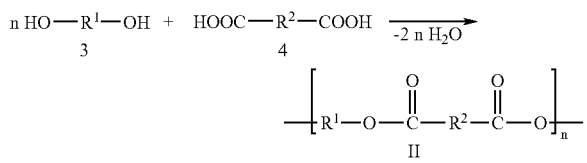

Branched and crosslinked polyesters are obtained by polycondensing tri- or polyhydric alcohols with polyfunctional carboxylic acids. Polycarbonates (polyesters of carbonic acid) are generally also regarded as polyesters.

Examples of AB-type polyesters (I) are polyglycolic acids (polyglycolides, R=CH2), polylactic acids (polylactides, R=CH—CH3), polyhydroxybutyric acid [poly(3-hydroxybutyric acid), R=CH(CH3)—CH2], poly(ε-caprolactone)s [R=(CH2)5], and polyhydroxybenzoic acids (R=C6H4).

AA-BB-type polyesters (II) which are purely aliphatic are polycondensates made from aliphatic diols and dicarboxylic acids, and are used, inter alia, as products having terminal hydroxyl groups (as polydiols) for preparing polyester polyurethanes (an example being polytetramethylene adipate; R1=R2=(CH2)4].

In quantity terms, the greatest industrial significance attaches to AA-BB-type polyesters made from aliphatic diols and from aromatic dicarboxylic acids, in particular the polyalkylene terephthalates [R2=C6H4, including polyethylene terephthalate (PET) R1=(CH2)2, polybutylene terephthalate (PBT) R1=(CH2)4, and poly(1,4-cyclohexanedimethylene terephthalate)s (PCDT) R1=CH2—C6H10—CH2], which are the most important representatives. These types of polyester can be given widely varying properties and be adapted to various application sectors through concomitant use of other aromatic dicarboxylic acids, (for example isophthalic acid) and, respectively, through the use of diol mixtures during the polycondensation.

Polyesters which are purely aromatic are the polyarylates, which include poly(4-hydroxybenzoic acid) (formula I, R=C6H4), polycondensates made from bisphenol A and phthalic acids (formula II, R1=C6H4—C(CH3)2—C6H4, R2=C6H4), or else those made from bisphenols and phosgene.

The adhesive mass of the first and second adhesion layer of the laser transfer films of the invention may be a self-adhesive mass based on natural rubber, on PU, on acrylates, or on styrene-isoprene-styrene block copolymers.

The use of adhesive masses based on natural rubber, on acrylates, or on styrene-isoprene-stryrene is known, and is also described in the "Handbook of pressure sensitive adhesive technology, second edition, edited by Donatas Satas, Van Nostrand Reinhold, New York, 1989.

A particular self-adhesive mass used is a commercially available pressure-sensitive adhesive mass based on PU, or on acrylate, or on rubber.

An adhesive mass which has proven particularly advantageous is one based on acrylate hot-melt and having a K value of at least 20, in particular more than 30, obtainable by concentrating a solution of this mass to give a system processable as a hot melt.

The concentration process may take place in appropriately equipped tanks or extruders, and for the associated devolatilization process here particular preference is given to a vented extruder.

An adhesive mass of this type is presented in DE 43 13 008 A1, the content of which is hereby incorporated herein by way of reference and is included in this disclosure and invention. The solvent is completely removed in an intermediate step from the acrylate masses prepared in this way.

At the same time, other volatile constituents are also removed. After coating of these masses from the melt, they have only small remaining contents of volatile constituents. Any of the monomers/mixes claimed in the abovementioned patent may therefore be adopted. Another advantage of the masses described in the patent is that they have a high K value and therefore a high molecular weight. The skilled worker is aware that systems with relatively high molecular weights can be crosslinked more efficiently. The result is a corresponding reduction in the content of volatile constituents.

The solution of the mass may comprise from 5 to 80% by weight, in particular from 30 to 70% by weight, of solvents. It is preferable to use commercially available solvents, in particular low-boiling hydrocarbons, ketones, alcohols, and/or esters.

Preference is also given to the use of single-screw, twin-screw, or multiscrew extruders with one, or in particular two or more, devolatilizing units. In the adhesive mass based on acrylate hot melt there may be benzoin derivatives incorporated into the polymer, e.g. benzoin acrylate or benzoin methacrylate, or acrylic esters or methacrylic esters. Benzoin derivatives of this type are described in EP 0 578 151 A1.

The adhesive mass based on acrylate hot melt may, however, also have been chemically crosslinked.

In one particularly preferred embodiment, the self-adhesive masses used comprise copolymers made from (meth) acrylic acid and esters thereof having from 1 to 25 carbon atoms, maleic, fumaric and/or itaconic acid, and/or esters thereof, substituted (meth)acrylamides, maleic anhydride and other vinyl compounds, such as vinyl esters, in particular vinyl acetate, vinyl alcohols, and/or vinyl ethers.

The residual solvent content should be less than 1% by weight.

An adhesive mass found to be particularly suitable is a low-molecular-weight acrylate hot melt adhesive mass as available from BASF with the name acResin UV or Acronal®), in particular Acronal DS 3458. This adhesive mass has a low K value and undergoes a final crosslinking initiated by radiation chemistry in order to obtain properties appropriate to its use.

Another adhesive mass which may be used is composed of the group of natural rubbers or of the synthetic rubbers, or of a desired blend of natural rubbers and/or synthetic rubbers, where the natural rubber or the natural rubbers may in principle be selected from any of the available grades, such as crepe, RSS, ADS, TSR, or CV grades, depending on the purity level and viscosity level needed, and the synthetic rubber or the synthetic rubbers may be selected from the group consisting of the randomly copolymerized styrene-butadiene rubbers (SBR), the butadiene rubbers (BR), the synthetic polyisoprenes (IR), the butyl rubbers (IIR), the halogenated butyl rubbers (XIIR), the acrylate rubbers (ACM), the ethylene-vinyl acetate copolymers (EVA), and the polyurethanes, and/or blends thereof.

The rubbers may preferably also have thermoplastic elastomers added, at a proportion by weight of from 10 to 50% by weight, based on the total elastomer content, to improve processability.

Representatives which may be mentioned at this point are especially the particularly compatible styrene-isoprene-styrene (SIS) and styrene-butadiene-styrene (SBS) grades.

As tackifying resins, use may be made of any, without exception, of the adhesive resins which are known and described in the literature. Representatives which may be mentioned are the rosins and their disproportionated, hydrogenated, polymerized, or esterified derivatives and salts, the aliphatic and aromatic hydrocarbon resins, terpene resins, and terpene phenol resins. Any desired combinations of these and other resins may be used in order to establish the desired properties of the resultant adhesive mass. Express reference is made to the prior art presented in "Handbook of Pressure Sensitive Adhesive Technology" by Donatas Satas (van Nostrand, 1989).

Hydrocarbon resin is a collective term for thermoplastic polymers which are colorless to intensely brown in color, with a molar mass which is generally <2000.

They can be divided up into three major groups according to their source: petroleum resins, coal tar resins and terpene resins. The most important coal tar resins are the coumarone-indene resins. Hydrocarbon resins are obtained by polymerizing the unsaturated compounds which can be isolated from the raw materials.

Polymers which have appropriately low molecular weight and are obtainable by polymerizing monomers such as styrene or by polycondensation reactions (certain formaldehyde resins) are also regarded as hydrocarbon resins. Hydrocarbon resins are products whose softening range varies within wide boundaries from <0° C. (in the case of hydrocarbon resins liquid at 20° C.) to >200° C., and with density of from about 0.9 to 1.2 g/cm$^3$.

They are soluble in organic solvents, such as ethers, esters, ketones, and chlorinated hydrocarbons, and insoluble in alcohols and water.

Rosin means a naturally occurring resin obtained from the crude resin from conifers. Distinction is made between three types of rosin: balsam resin, a residue from distilling turpentine oil, wood resin, an extract from conifer stumps, and tall resin, a residue from the distillation of tall oil. In volume terms, balsam resin is the most significant.

Rosin is a transparent brittle product, red to brown in color. It is insoluble in water, but soluble in many organic solvents, such as (chlorinated) aliphatic or aromatic hydrocarbons, esters, ethers, and ketones, and also in vegetable and mineral oils. The softening point of rosin is in the range from about 70 to 80° C.

Rosin is a mixture made from about 90% of resin acids and 10% of neutral substances (fatty acid esters, terpene alcohols, and hydrocarbons). The most important resin acids for rosins are unsaturated carboxylic acids of empirical formula C20H30O2, abietic, neoabietic, levopimaric, pimaric, isopimaric, and palustric acid, and also hydrogenated and dehydrogenated abietic acid.

The quantitative proportions of these acids vary as a function of the source of the rosin.

Plasticizers which may be used are any of the known plasticizing substances. These include, inter alia, the paraffinic and naphthenic oils, (functionalized) oligomers, such as oligobutadienes and -isoprenes, liquid nitrile rubbers, liquid terpene resins, vegetable and animal oils and fats, phthalates, and functionalized acrylates.

For thermal induction of chemical crosslinking, use may be made of any known thermally activatable chemical crosslinkers, for example accelerated sulfur or sulfur donor systems, isocyanate systems, reactive melamine resins, formaldehyde resins, and (optionally halogenated) phenol-formaldehyde resins, and/or reactive phenolic resin or reactive diisocyanate crosslinking systems, in each case with the appropriate activators, epoxidized polyester resins or epoxidized acrylate resins, or combinations thereof.

The crosslinkers are preferably activated at temperatures above 50° C., in particular at temperatures of from 100° C. to 160° C., very particularly preferably at temperatures of from 110° C. to 140° C.

IR radiation or high-energy alternating fields may also be used for a thermal excitation of the crosslinkers.

The adhesive masses intended for use according to the invention are intended to be transparent and/or translucent, and at least to be designed so as to avoid any absorption of the laser beam, which would lead to their breakdown.

In particular, it is desirable that the adhesive mass absorbs no light within the range of wavelengths from 530 to 1064 nm.

The first pigment layer with the glass flux pigment and with the absorber is preferably applied in the form of a solvent suspension, e.g. an isopropanol suspension, to the first adhesion layer, in particular at a thickness of from 2 μm to 5 μm.

The second pigment layer with the glass flux pigment, with the absorber and with the laser-sensitive pigment is likewise preferably applied in the form of a solvent suspension, e.g. an isopropanol suspension, to the first pigment layer, and specifically at a thickness of from 2 μm to 5 μm.

Laser-sensitive pigments here mean pigments which change their color under laser irradiation.

Suitable laser-sensitive additives are in particular color pigments and metal salts. Use is particularly made of pigments from TherMark, e.g. TherMark-Pigmente® 120-30 F (black), which are metal oxides, e.g. molybdenum trioxide. It is also possible to use mixtures of two or more pigments or blends of pigments with glass flux pigments; these are obtainable from Merck, and can lead to a sintering process.

The additive may also be used in addition to the preferred absorber titanium dioxide.

The amounts of these additives preferably admixed with the suspension for forming the layer (e.g. as described in DE G 81 30 861) are in particular of the order of size of from a few ppm to a maximum of 10% by weight, preferably from 0.1 to 10% by weight, in particular from 0.5 to 6% by weight, based on the total weight of the layer, very particularly advantageous concentrations specifically being 0.5% by weight, 1% by weight, 2.5% by weight, and 4% by weight.

Other laser-sensitive pigments with excellent suitability are various pigments from Merck (such as the pearl-luster pigments EM 143220 and BR 3-01).

The glass flux pigment and absorber used preferably comprise silicon dioxide or mixtures, such as BaO—CaO—$SiO_2$.

The following particle size distribution for the glass flux pigments is advisable for an inventive laser transfer film:

| Type | Description | Average grain size [μm] |
|---|---|---|
| SM | Narrow distribution | 2.5-3.5 |
| UF | Dental powder, also silanized | 0.7-1.5 |

The following distributions are possible, but their use is not preferred:

| Type | Description | Average grain size [μm] |
|---|---|---|
| K | Standard | 3.0-30.0 |
| FK | High powder purity | 1.0-3.5 |
| VT | Broad distribution | 4.0-10.0 |

Glass powders as described above can be purchased from Schott, for example.

If the standard lasers are utilized, specifically the widely used Nd-YAG solid-phase lasers with wavelength 1.06 μm, the laser beam penetrates through the backing layer and the adhesion layer and impacts the glass flux pigment and the absorber, and also, in the second pigment layer, the laser-sensitive pigment.

In the first pigment layer with a glass flux pigment and with an absorber, only the glass is melted during laser inscription. In the second pigment layer with a glass flux pigment, with an absorber, and with a laser-sensitive pigment, the desired transfer of the metal oxide onto the substrate to be inscribed takes place during the laser inscribing process, and the metal oxide is simultaneously coated here with a glass layer.

The result is a sintering process in which the laser-sensitive pigment is transferred to the substrate and bonds durably and stably to the substrate.

Sharp, high-contrast inscriptions and identification markings are obtained.

The known direct and indirect application methods are suitable for applying the adhesive mass to the backing material, and also for applying the at least two pigment layers.

Mention may be made of the Accugravur process, the doctor-blade process, the doctor roller process, the RCC process, the Super Reco process, the RAM process, and the use of an air brush and casting processes, and also screen-printing processes.

Acrylate hot melts may be applied to the backings mentioned not only by the standard application processes, such as direct coating from nozzles, by way of rolls, and the like, but also by the transfer process, as disclosed in DE 43 24 748 C2. In this case, the adhesive mass is first applied to a running continuous belt with antiadhesive properties and then transferred to the backing material in a laminating unit—using pressure and heat if required to improve anchoring of the mass.

It is also possible in principle to apply the adhesive mass from organic solvents or as an aqueous dispersion. However, the economic and environmental advantages of the hot melt supply form are well known.

The adhesive mass and the pigment layers may also be applied as points within a grid, by screen printing (DE 42 37 252 C2) in which case the small spots of adhesive may also vary in their size and/or distribution (EP 0 353 972 B1), or by gravure printing (DE 43 08 649 C2) in coherent longitudinal or transverse bars, or by dot-matrix printing, or by flexographic printing.

It is preferable for both layers to be dome-like shapes from screen printing, or else to have been applied in some other pattern, such as grids, stripes, zigzag lines, or else by gravure printing, for example. They may also have been applied by spraying, for example, giving an application profile with some degree of non-uniformity.

In one preferred embodiment, these have been applied in the form of polygeometric domes.

The domes may have various shapes. Preference is given to flattened hemispheres. It is also possible for other shapes and patterns to be applied by printing onto the backing material, for example a printed image in the form of alphanumeric character combinations, or patterns such as grids, stripes, or else assemblies of domes, or zigzag lines.

Improved protection of the colorant component is achieved via the individual, in particular two, pigment layers. The probability of sheathing of the metal oxides by glass is increased via the separation of the individual components into two or more layers.

The inventive multilayer laser-transfer film exhibits excellent properties, in particular much better properties than those exhibited by the transfer films which have laser-sensitive pigments homogeneously distributed within the adhesive mass layer, where intensive laser beam/pigment/adhesive mass interaction takes place. The result is thermal stress, the results of which can extend to breakdown of the film (melting).

Another result can be a highly adverse effect on the adhesive mass, in terms of its temporary adhesion property (adhesive mass balling) and in terms of transfer of the pigments into or onto the component.

The result of the pigmented boundary layer toward the adhesion component is that the inventive film does not exhibit the adverse effects on coatings and plastics sheets (PP), but rather a durable inscription on the component.

Additional advantages result via lower pigment use when comparison is made with the homogeneous distribution of the pigment in the entire adhesive mass, and via the resultant reduction in the number of problems in pigment dispersion, and via very little laser beam/pigment/adhesive mass interaction.

A very good inscription result is achieved. In addition, the amount of fume generated is surprisingly small. Directly after inscription, the inscription characters were slightly wider but very high-contrast. After a polish, the contrast reduces slightly, but the outlines of the script become somewhat sharper.

The inventive film also gives excellent results when used on rough surfaces, e.g. on the ceramic base of fuses, or generally on glass.

Advantages become fully apparent in particular in the form of a stamped label, which can be applied to the component and irradiated by a laser. After inscription, it is peeled away. The procedure is complete.

The inventive laser transfer film may be supplied in the form of a continuous roll which has been wound up in the shape of an Archimedean spiral around at least one cardboard shell, and in the form of a stamped label. The latter can have any desired shape with excellent adaptation to the respective intended use.

BRIEF DESCRIPTION OF THE DRAWINGS

The figures described below are used for more detailed illustration of the inventive film in particularly advantageous embodiments, but there is no intention of any resultant unnecessary restriction of the invention.

FIG. 1 shows the structure of an inventive film in the form of a label. The film is composed of the backing layer 1, the first adhesive layer 2, which has been applied to the entire surface of the backing material 1, the first pigment layer 3, which comprises a glass flux pigment and an absorber, and the second pigment layer 4, the latter comprising a glass flow pigment, an absorber, and a laser-sensitive pigment.

The two pigment layers 3 and 4 have likewise been applied over the entire surface.

An additional second adhesive layer 5 has been applied. This adhesive layer 5 has been applied to only part of the material in the form of individual domes.

These serve as retainer points or a positioning aid for the film on the substrate.

Figure 1:
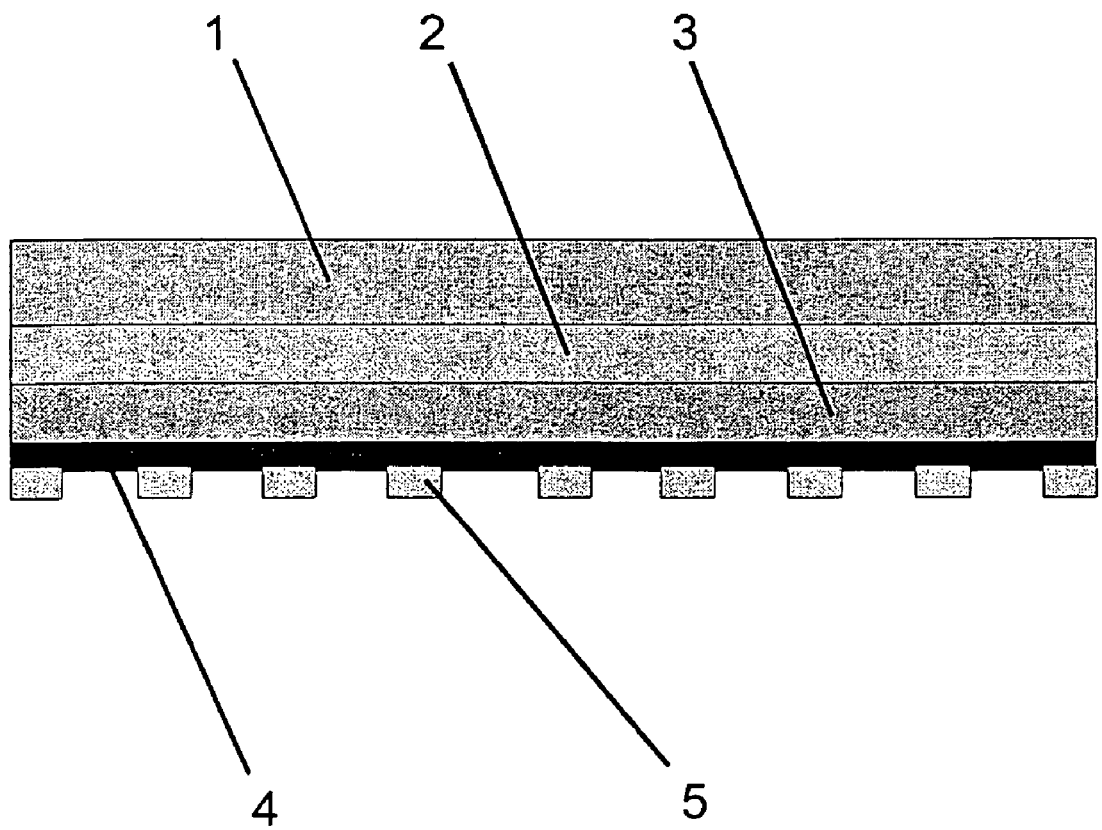
FIG. 1 shows the structure of an inventive film in the form of a label, an additional second adhesive layer having been applied.
Figure 2:
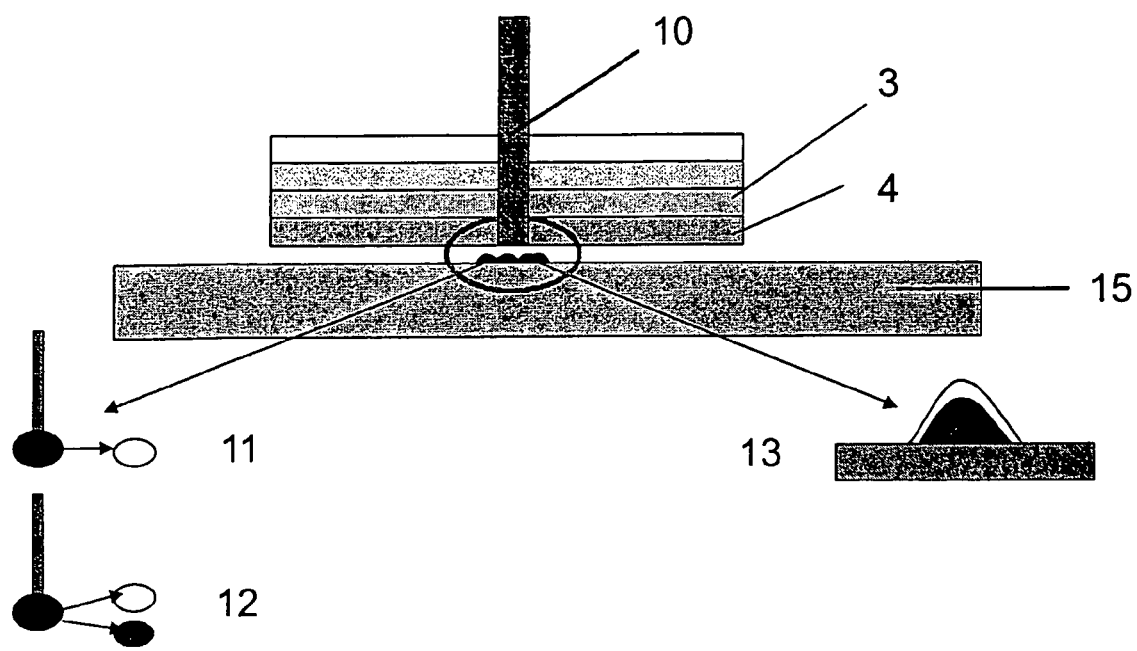
FIG. 2 shows the procedure for inscription of a component using the inventive film.

FIG. 2 discloses the procedure for inscription of a component 15 using the inventive film. First, the laser transfer film, ideally in the form of a label, is applied to the component 15, thus achieving adhesion and securing of the label via the adhesion layer. The inscription then takes place by means of a laser, indicated by the red cylinder 10.

In the first layer 3, the melting 11 of the preferred glass particles takes place, and in the second layer the transfer 12 to the substrate takes place, the energy of the laser 10 being absorbed via absorbers.

Finally, (13) after the melting process the glass particles sheath the metal oxide transferred to the component 15.

Once the inscription procedure has ended, the transfer film is removed, and the desired inscription 12 remains on the component and is in essence composed of individual points which in turn are composed of metal oxide deposits coated by a glass layer.

What is claimed is:

1. A multilayer laser transfer film for durable inscription on components made from at least one backing layer, where on at least part of the underside of the backing layer there is a first adhesion layer, wherein, on the backing-layer side of the laser transfer film on which the first adhesion layer is located, there is at least a first pigment layer applied to at least part of the material and comprising at least one glass flux pigment, and a second pigment layer applied to at least part of the material and comprising at least one laser-sensitive pigment.

2. The multilayer laser transfer film as claimed in claim 1, wherein the first pigment layer comprises a glass flux pigment and an absorber, and/or the second pigment layer comprises a glass flux pigment, an absorber, and a laser-sensitive pigment.

3. The multilayer laser-transfer film as claimed in claim 1 claim 1, wherein the matrix of the pigment layers is composed of the adhesive of the first adhesion layer, so that the first adhesion layer and the pigment layers form a single homogeneous layer.

4. The multilayer laser-transfer film as claimed in claim 1, wherein a second adhesive layer is applied to the second pigment layer comprising the laser-sensitive pigment.

5. The multilayer laser-transfer film as claimed in claim 1, wherein the backing material comprises films selected from the group consisting of, monoaxially and biaxially stretched films based on polyolefins, and, optionally PVC films, PET films, films based on vinyl polymers, on polyamides, on polyester, on polyacetals, on polycarbonates.

6. The multilayer laser-transfer film of claim 5, wherein said monoaxially and biaxially stretched films based on polyolefin are films based on stretched polyethylene or on stretched copolymers containing ethylene units and/or polypropylene units.

7. The multilayer laser-transfer film of claim 5, wherein said monoaxially and biaxially stretched films based on polyolefins and said PVC films, PET films, said films based on vinyl polymers, on polyamides, on polyester, on polyacetals, or on polycarbonates are transparent films.

8. The multilayer laser-transfer film as claimed in claim 1, wherein the adhesion layer comprises a self-adhesive mass based on natural rubber, on PU, on acrylates, or on styrene-isoprene-styrene block copolymers.

9. The multilayer laser-transfer film as claimed in claim 1, wherein the backing layer and the adhesive mass are transparent and/or translucent, at least to the extent that there is no absorption of the laser beam during inscription which would lead to their breakdown.

10. The multilayer laser-transfer film as claimed in claim 1, comprising color pigments and metal salts in the boundary layer or mixtures of pigments with glass particles.

11. The multilayer laser-transfer film of claim 10, wherein said multilayer laser-transfer films comprise metal oxides.

12. A method for applying a durable inscription to glass, ceramic, and/or metal, which comprises applying same with the multilayer laser-transfer film of claim 1.

13. A method for applying a durable inscription to coatings or plastics sheets which comprises applying same with the multilayer laser-transfer film of claim 1.

14. A stamped label comprising the multilayer laser-transfer film of claim 1.

* * * * *